United States Patent [19]
Kondo et al.

[11] 4,084,847
[45] Apr. 18, 1978

[54] SEAM IN A BODY OUTER PANEL OF A VEHICLE

[75] Inventors: Masatsune Kondo; Yoshiaki Sawami; Yukio Tamura, all of Toyota, Japan

[73] Assignee: Toyota Jidosha Kogyo Kabushiki Kaisha, Toyota, Japan

[21] Appl. No.: 709,723

[22] Filed: Jul. 29, 1976

[30] Foreign Application Priority Data

Aug. 6, 1975 Japan .................. 59-95561

[51] Int. Cl.² .............................................. B62D 27/00
[52] U.S. Cl. .................................... 296/28 R; 219/106
[58] Field of Search ............... 219/91, 86, 102, 104, 219/106, 107, 137 R; 296/28 R, 137 R

[56] References Cited
U.S. PATENT DOCUMENTS

| | | | |
|---|---|---|---|
| 1,308,781 | 7/1919 | Gravell | 219/106 |
| 1,767,465 | 6/1930 | Ledwinka | 296/28 R |
| 1,995,546 | 3/1935 | Meier | 219/106 X |
| 2,246,579 | 6/1941 | Ewertz | 219/107 X |
| 2,258,913 | 10/1941 | Stowe | 219/137 R X |
| 2,265,943 | 12/1941 | Laig | 219/106 |
| 2,280,150 | 4/1942 | Hasse | 219/137 R X |
| 4,004,124 | 1/1977 | Nakane | 219/91 X |

Primary Examiner—E. A. Goldberg
Attorney, Agent, or Firm—Birch, Stewart, Kolasch & Birch

[57] ABSTRACT

Edges of first and second panel plates to be joined together are butted to each other along a seam to be formed under a backing support by a backing member extending along the seam to lie over both of the two panel plates. The backing member being wide enough to extend over both sides of the seam and having a substantially higher rigidity than the panel plates, wherein the butting edges of the two panel plates and the backing member are all welded together along the seam.

6 Claims, 9 Drawing Figures

FIG. 6
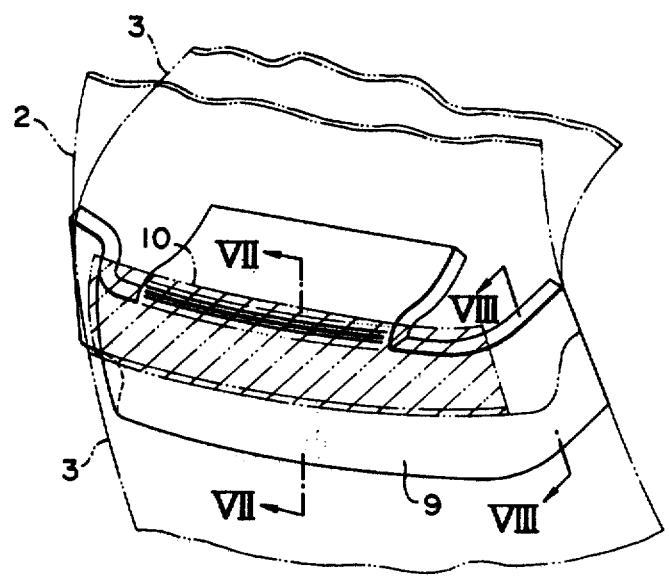
FIG. 7  FIG. 8  FIG. 9
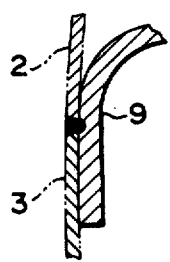 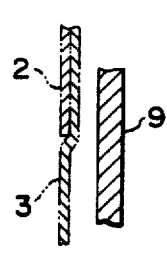 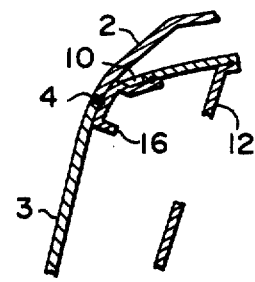

SEAM IN A BODY OUTER PANEL OF A VEHICLE

BACKGROUND OF THE INVENTION

1. Field of the Invention

The present invention relates to forming a seam in the body outer panel of a vehicle such as an automobile.

2. Description of the Prior Art

The body outer panel of a vehicle such as an automobile is usually constructed of a plurality of plate elements which have been preformed by a press, said elements being joined with each other thereby forming a seam at the joining portion. For example, as shown in FIG. 1, the side wall portions of an automobile provided at the opposite sides of a rear window 1 include seams 4 formed between a roof panel 2 and quarter panels 3. These seams should preferably be formed so as not to be noticable from the outside. For this purpose, the seam 4 is conventionally formed by the procedures as shown in FIG. 2. Explaining in detail, the rear quarter panel 3 is largely bent inwardly at a seam forming location to provide a recess portion 3a, while the roof panel 2 is also largely bent inwardly at a seam forming location to provide a bent portion 2a. The bent portions 2a and 3a are joined together by spot welding so as to form co-welded portions 5. Then a recess 6 defined by the bent portions 2a and 3a is filled with a lump of solder having an outer surface 8 which swells beyond a smooth transient contour surface 7 connecting the roof panel 2 and the rear quarter panel 3. After the solder has solidified, an excessive portion thereof is removed by a grinding process until the seam 4 having the smooth contour surface 7 is obtained. The conventional method of mounding a lump of solder presents an occupational disease situtation in that the worker's health can be injured by the atmosphere produced by soldering. With regard to the quality of this product, the conventional method is not advantageous because the quality rapidly deteriorates by generation of pinholes or blisters making it difficult to obtain a good finish of the painted surface. Furthermore, the conventional method has an economical disadvantage because it requires a large amount of manpower and materials. In order to avoid the soldering process, to connect joining ends of the roof panel 2 and the rear quarter panel 3 individually formed to follow the final panel contour, other techniques such as fusion welding, pressure welding, brazing or the like have been attempted. These techniques employ a substantially larger quantity of heat which is charged to the joining portion relative to the heat employed in the soldering process thereby causing a problem in that the thin plates such as those forming the outer panel of automobile are deformed. This deformation produces a waving of the panels running along the welding line and causes deflections perpendicular to the welding line, making it extremely difficult to amend the deformation.

SUMMARY OF THE INVENTION

The object of the present invention is to solve the abovementioned problems in forming a seam in a body outer panel of automobiles and to provide a method of directly welding the joining portion of the roof panel and the rear quarter panel which are formed to follow the final contour without causing any deformation of the panel plates in spite of a large quantity of heat charged to the panels in the welding process.

According to the present invention, the abovementioned object is accomplished by a method of forming a seam by connecting first and second panel plates which form an outer panel of a vehicle such as an automobile, comprising the steps of butting edges of said first and second panel plates to each other along said seam, applying a backing member to the rear surfaces of said two panel plates along said seam to lie over both of said two panel plates, said backing member being wide enough to extend over both sides of said seam and having a substantially higher rigidity than said panel plates, and welding said edges of said two panel plates and said backing member altogether along said seam.

When thin panel plates are directly welded together, they will be deformed due to a large quantity of heat charged to the welding portion as mentioned above. By contrast, the present invention does not rely upon the concept of directly welding thin panel plates with each other but the invention proposes the concept of welding first and second thin panel plates which are to be joined together individually to a third backing member such as a belt member having a substantially higher rigidity than the thin panel plates. In this case, by butting edges of the first and second panel plates to each other, the two panel plates are simultaneously welded with each other when they are individually welded to the belt member thereby forming weld seam between the two panel plates. According to the welding method of the present invention, the individual thin panel plates are firmly supported by the backing member during the welding process which is sufficiently rigid so as not to cause any deformation by the charge of a quantity of heat required for welding the individual panel plates to the backing member. Thus even when the panel plates are simultaneously welded with each other as they are welded to the backing member, the panel plates are restrained from deforming at the welding portion. Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a perspective view showing the structure of the belt member 9 included in FIGS. 3-5;

FIGS. 7 and 8 are sectional views along line VII—VII and VIII—VIII in FIG. 6, and;

FIG. 9 is a view similar to FIG. 4, showing another embodiment of the invention.

DESCRIPTION OF THE PREFERRED EMBODIMENT

Figure 1:
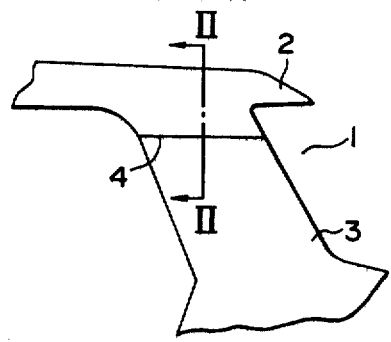
FIG. 1 is a front view of a seam between the roof panel and the rear quarter panel in an automobile.
Figure 2:
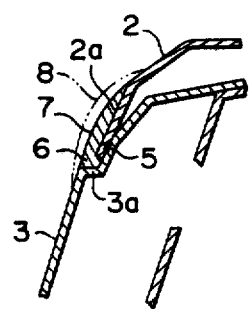
FIG. 2 is a sectional view along line II—II in FIG. 1 showing a conventional method of forming the seam.
Figure 3:
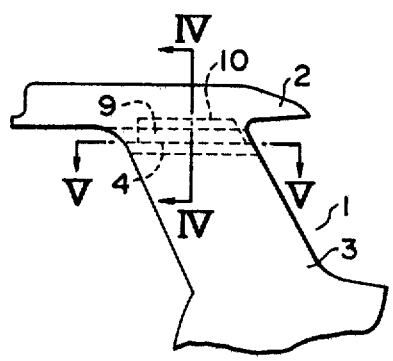
FIG. 3 is a view similar to FIG. 1, showing the structure of a seam formed according to the method of the present invention.
Figure 4:
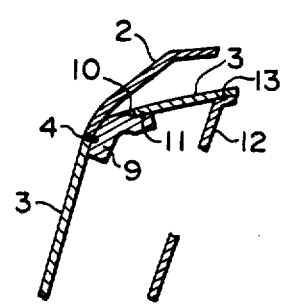
FIGS. 4 and 5 are sectional views along lines IV—IV and V—V in FIG. 3, respectively.
Figure 5:
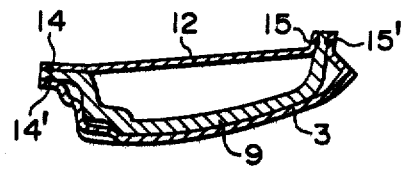

The present invention will now be explained in more detail with reference to FIGS. 3-9. As best shown in FIG. 4, the edges of the roof panel 2 and the rear quarter panel 3 are butted to each other along a seam 4 with the rear surfaces thereof contacting a belt member 9 extending along the seam to lie over both of the two panel plates, said belt member having a substantially higher rigidity (due to a larger thickness) than the panel plates 2 and 3. The edges of the roof panel 2 and the rear quarter panel 3 are individually welded to the belt member and, simultaneously, the butted edges of the two panel plates are welded with each other. In the shown particular embodiment, the belt member 9 is formed to be of a particular shape as shown in FIGS. 5 and 6. In this case, the rear quarter panel 3 is formed with a slit opening 10 adjacent the seam 4 and an edge (lower edge) defining the slit opening 10 is butted with a portion of the lower edge of the roof panel 2. The belt member 9 may conveniently be welded with the rear quarter panel 3 at a welding portion 11 prior to butt welding between the roof panel 2 and the rear quarter panel 3. An upper edge portion of the rear quarter panel 3 is welded with a roof side inner panel 12 at a welding portion 13, while the roof side inner panel 12 and the belt member 9 are connected with each other at opposite ends thereof by welding portions 14 and 15. Adjacent the welding portion 14 and 15, other welding portions 14' and 15' are formed which connect the belt member 9 and the rear quarter panel 3 (and the roof panel 2) with each other.

From FIGS. 7 and 8 showing sections along lines VII—VII and VIII—VIII, it will be understood that the joining portions of the roof panel 2 and the rear quarter panel 3 are butted to each other along a principal portion of the seam 4 which extends along the lower edge of the opening 10 formed in the rear quarter panel 4 and the butted edges are simultaneously welded to the belt member 9 thereby forming a smooth seam.

In the modification shown in FIG. 9, a channel member 16 made of a relatively thin plate is used in place of the belt member 9 which has a substantially larger thickness than the panel 2 or 3. By forming a relatively thin plate into a channel member, the backing member for the seam 4 which shows a high rigidity against thermal deformation is available, thereby providing a firm support for the roof panel 2 and the rear quarter panel 3 so that they are restrained from deforming due to the heat charged by welding.

Although the present invention has been explained with reference to particular embodiments of connecting the roof panel and the rear quarter panel, it will be understood by those skilled in the art that the invention is not limited to such an application and that the present invention is similarly applicable to forming a seam between relatively thin plates such as the outer panel of automobiles when the seam should present a smooth appearance. The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim:

1. A seam structure for a body outer panel of an automobile, comprising:
    a roof panel having a downward directed edge;
    a rear quarter panel having an inwardly curved upper end portion having a slit opening and an upper extension located above said slit opening for connection with a third member;
    said slit opening defining an upward directed edge to abut said downward directed edge of said roof panel; and
    a backing member attached to the rear surfaces of said two panel plates along said abutted edges and having a substantially higher rigidity than said panel plates, wherein said two panel plates and said backing member are welded together along said abutted edges.

2. The seam of claim 1, wherein said backing member is a belt member substantially thicker than said panel plate.

3. The seam of claim 1, wherein said backing member is a channel member.

4. The seam of claim 1, wherein said backing member has an inwardly bent upper extension, which is welded together with a lower edge portion of said upper extension of said rear quarter panel.

5. The seam of claim 1, wherein said third member is a roof side inner panel.

6. The seam of claim 5, wherein said backing member has inwardly bent opposite ends which are welded together with corresponding opposite ends of said roof panel, rear quarter panel, and roof side inner panel.

* * * * *